US009720961B1

(12) United States Patent
Schaefer et al.

(10) Patent No.: US 9,720,961 B1
(45) Date of Patent: Aug. 1, 2017

(54) ALGEBRAIC DATA TYPES FOR DATABASE QUERY LANGUAGES

(71) Applicant: SEMMLE LIMITED, Oxford (GB)

(72) Inventors: Max Schaefer, Oxford (GB); Alexander Eyers-Taylor, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/282,681

(22) Filed: Sep. 30, 2016

(51) Int. Cl.
*G06F 17/30* (2006.01)
*G06F 15/16* (2006.01)

(52) U.S. Cl.
CPC .. *G06F 17/30427* (2013.01); *G06F 17/30513* (2013.01); *G06F 17/30404* (2013.01)

(58) Field of Classification Search
CPC ......... G06F 17/30513; G06F 17/30321; G06F 17/30421; G06F 17/30427
See application file for complete search history.

(56) References Cited

U.S. PATENT DOCUMENTS

| 2007/0038651 | A1* | 2/2007 | Bernstein | G06F 17/30587 |
| 2007/0276802 | A1* | 11/2007 | Piedmonte | G06F 17/30463 |
| 2010/0205197 | A1* | 8/2010 | Polyviou | G06F 17/30595 707/758 |

OTHER PUBLICATIONS

'wiki.haskell.org' [online]. "Algebraic data type," Jun. 27, 2014 [retrieved on Dec. 9, 2016]. Retrieved from the Internet: URL<https://wiki.haskel.org/Algebraic_data_type>. 3 pages.
'chris-taylor.github.io' [online]. "The Algebra of Algebraic Data Types, Part 1," Feb. 10, 2013, [retrieved on Dec. 9, 2016]. Retrieved from the Internet: URL<http://chris-taylor.github.io/blog/2013/02/10/the-algebra-of-algebraic-data-types/>. 7 pages.
'www.wikipedia.org' [online]. "Algebraic data type," Aug. 1, 2016, [retrieved on Dec. 9, 2016]. Retrieved from the Internet: URL <https://en.wikipedia.org/wiki/Algebraic_data_type>. 6 pages.

(Continued)

*Primary Examiner* — Brittany N Allen
(74) *Attorney, Agent, or Firm* — Fish & Richardson P.C.

(57) ABSTRACT

Methods, systems, and apparatus, including computer programs encoded on computer storage media, for implementing algebraic data types in database query languages. One of the methods includes receiving an expression in a database query language, the expression having a programming language construct representing an algebraic data type, wherein the expression specifies two or more alternative subtypes. Respective domain relations are generated using definitions of each of the alternative subtypes within the expression. Unique domain identifiers are assigned among domain tuples belonging to each alternative subtype. A union relation is generated for the algebraic data type. Unique union identifiers are assigned for union tuples belonging to the union relation. Respective injector relations are generated for each of the alternative subtypes.

24 Claims, 4 Drawing Sheets

(56) References Cited

OTHER PUBLICATIONS

'developer.logicblox.com' [online]. "LogicBlox 4 Reference Manuel," Nov. 6, 2016, [retrieved on Dec. 9, 2016]. Retrieved from the Internet: URL <https://developer.logicblox.com/content/docs4/core-reference/webhelp/predicates.html>. 12 pages.

Daniel Eklund, "Probably Done Before: What the Heck are Algebraic Data Types?," dated Dec. 28, 2011, Retrieved from the Internet: URL<http://merrigrove.blogspot.com/2011/12/another-introduction-to-algebraic-data.html>. 7 pages.

Alexandre Bertalls, "Abstract Algebraic Data Type," dated Feb. 15, 2015, Retrieved from the Internet: URL<https://bertails.org/2015/05/15/abstract-algebraic-data-type/>. 20 pages.

\* cited by examiner

ALGEBRAIC DATA TYPES FOR DATABASE QUERY LANGUAGES

BACKGROUND

This specification relates to database query languages.

In computer programming languages generally, a type is a property of a programming language construct. Types restrict the operations that are permitted between constructs in the language. The type rules that define permissible operations between constructs of different types are enforced by a compiler, interpreter, or evaluation engine of the programming language. For example, the type rules in Python do not allow a variable having an integer type to be called as a function. Therefore, an interpreter for Python will raise a type error if the source code attempts this operation.

Some programming languages have algebraic data types. An algebraic data type is a type that is defined using algebraic operations on other subtypes. Algebraic data types commonly have two forms: (1) sum types defined by the union of two or more subtypes, and (2) product types that are defined by an ordered sequence of two or more subtypes.

The semantics of a sum type that uses a first subtype and a second subtype means that an instance of the sum type is considered to be either the first subtype or the second subtype, but not both. The semantics of a product type that uses a first subtype and a second subtype means that an instance of product type has instances of both the first subtype and the second subtype.

As used in this description, a database query language is a query language for a relational database that operates only on atomic values and does not allow operations on structured values, such as pairs, lists, or other structured values. Datalog is an example of a database query language that operates only on atomic values. This allows Datalog to maintain clean semantics, but makes some programming tasks cumbersome or impossible.

As used in this description, a "relation" is a set of tuples $(t_1, \ldots, t_n)$, each tuple having $n \geq 1$ data elements $t_i$. Each element $t_i$ is a corresponding value, which may represent a value of a corresponding attribute. The attribute will generally have an attribute name. The correspondence between attribute and value is determined by the position of the value in the tuple, i.e., each attribute has a corresponding position. Relations are commonly thought of as, represented as, and referred to as tables in which each row is a tuple and each column is an attribute.

As used in this description, a "programming language construct" is a syntactically allowable part of a programming language. Each programming language construct has particular semantics, which defines the meaning of the programming language construct and which specifies processes that a computer should follow to compute a result for the programming language construct. A programming language construct is a built-in feature of a programming language, to be distinguished from a function, which can be user-defined.

As used in this description, an "expression" is a portion of a computer program having one or more programming language constructs.

As used in this description, an "evaluation engine" is a computer program that, when executed, evaluates expressions of a particular programming language.

As used in this description, a "predicate" of a logic programming language is an expression that when evaluated by an evaluation engine, causes the evaluation engine to generate tuples that belong to an associated relation for the predicate. When a tuple is provided as an argument to a predicate, the expression evaluates to true if the value occurs in the associated relation and false otherwise.

As used in this description, a "recursive predicate" is a predicate that references its own definition.

SUMMARY

This specification describes how a system can implement algebraic data types for database query languages. The algebraic data types can specify one or more alternative subtypes. The algebraic data types can be referenced in queries that can operate on either or both of the alternative subtypes.

Particular embodiments of the subject matter described in this specification can be implemented so as to realize one or more of the following advantages. Implementing algebraic data types for database query languages makes writing programs more elegant and robust to changes. Algebraic data types help to encapsulate the implementation details of program elements. This makes queries that use algebraic data types easier to use and more reusable generally. Using algebraic datatypes can also result in more efficient execution. For example, a system can perform a join against an algebraic data type representing a tuple, which is more efficient than performing a join on each tuple element individually. The system can enforce a type system that makes alternative subtypes of algebraic data types incompatible with each other and other types except for the algebraic data type itself. This makes writing programs safer and less prone to errors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a computer system can implement algebraic data types for database query languages that do not allow operations on structured values.

Figure 1:
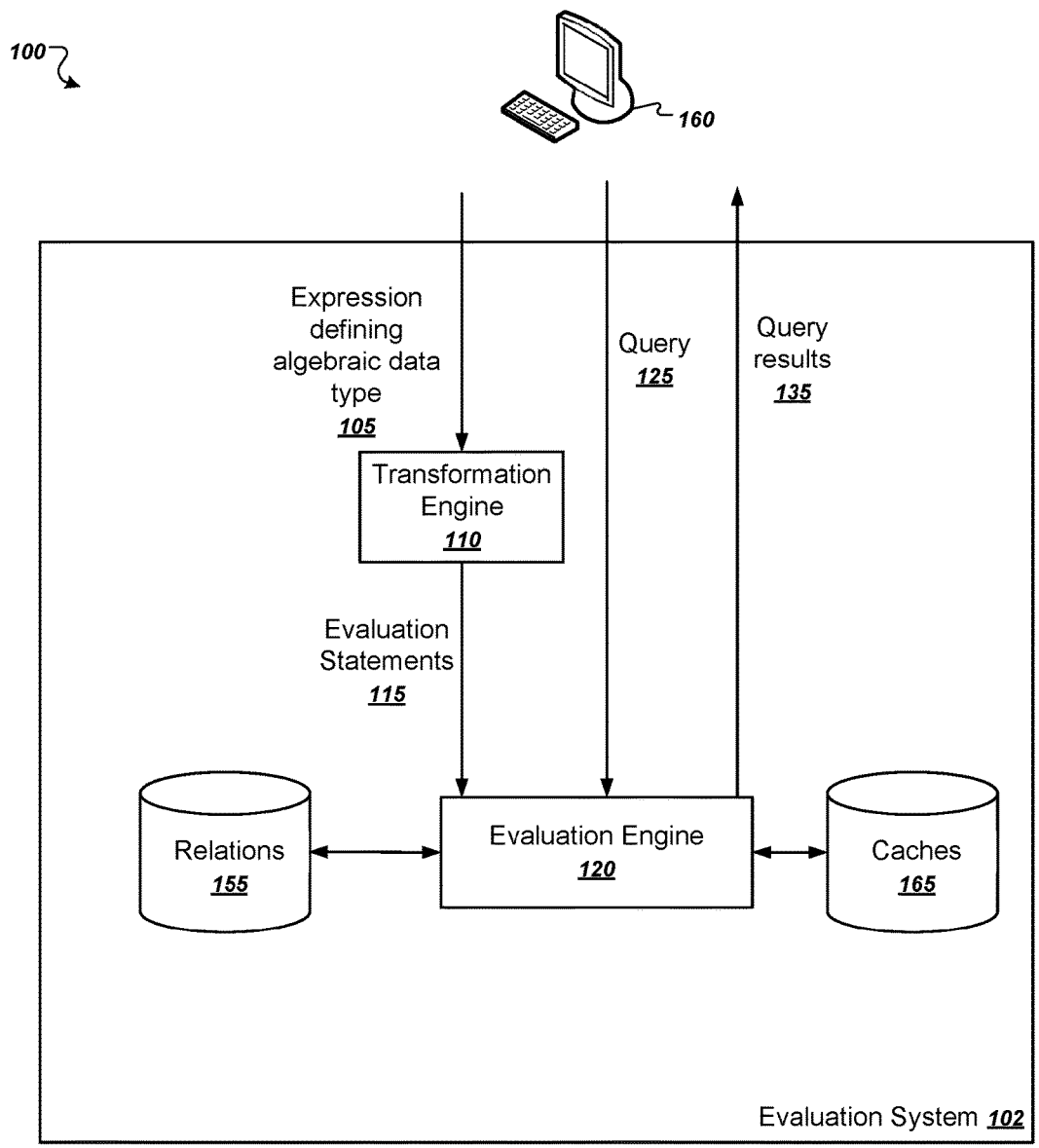
FIG. 1 is a diagram of an example system.

FIG. 1 is a diagram of an example system 100. The system 100 includes a user device 160 in communication with an evaluation system 102. The evaluation system is an example of a system that can implement algebraic data types for database query languages. The user device 160 and the evaluation system 102 can be installed on separate computer systems and communicate over any appropriate communications network or combination of networks. Alternatively, the evaluation system 102 can be installed in whole or in part on the user device 160.

The evaluation system 102 includes an evaluation engine 120 and a transformation engine 110. Each of these components can be implemented as computer programs installed on one or more computers in one or more locations. The transformation engine 110 and the evaluation engine 120 can be implemented as separate computer programs or within the same computer program. For example, the transformation engine 110 can be implemented as a module of the evaluation engine 120.

The evaluation engine 120 evaluates expressions in a database query language. In doing so, the evaluation engine 120 can generate and update relations 155 that correspond to evaluated expressions.

The transformation engine 110 takes as input expressions that define algebraic data types 105 and generates one or more evaluation statements 115. The evaluation statements 115 are instructions that represent how the evaluation engine 120 can generate special, system-defined relations in order to implement the algebraic data type using only atomic operations that are built-in to the database query language. The evaluation statements 115 can be in the same database query language or in another programming language.

When evaluating the evaluation statements 115, the evaluation engine 120 also uses one or more caches 165. Each cache stores keys that represent unique tuples that have already been processed for tuples belonging to a particular subtype of the algebraic data type. Thus, the system can include one cache for each alternative subtype defined by algebraic data types that have been evaluated. Alternatively, the system can also include one cache per arity, e.g., one cache for one-tuples, one cache for two-tuples, and so on. Alternatively or in addition, the system can include one cache for each representation type of tuples that have been seen, where the representation type is defined by the types of each tuple element. In other words, a tuple having (int, string) elements would have a different representation type than a tuple having (int, int) elements.

After generating the relations 155 that support the algebraic data type 105, the evaluation system 102 can receive a query 125. The query 125 can reference the defined algebraic data type. The evaluation engine can then use the relations defined by the evaluation statements 115 to compute query results 135 for the query, which the evaluation system 102 can provide back to the user device 160.

Figure 2:
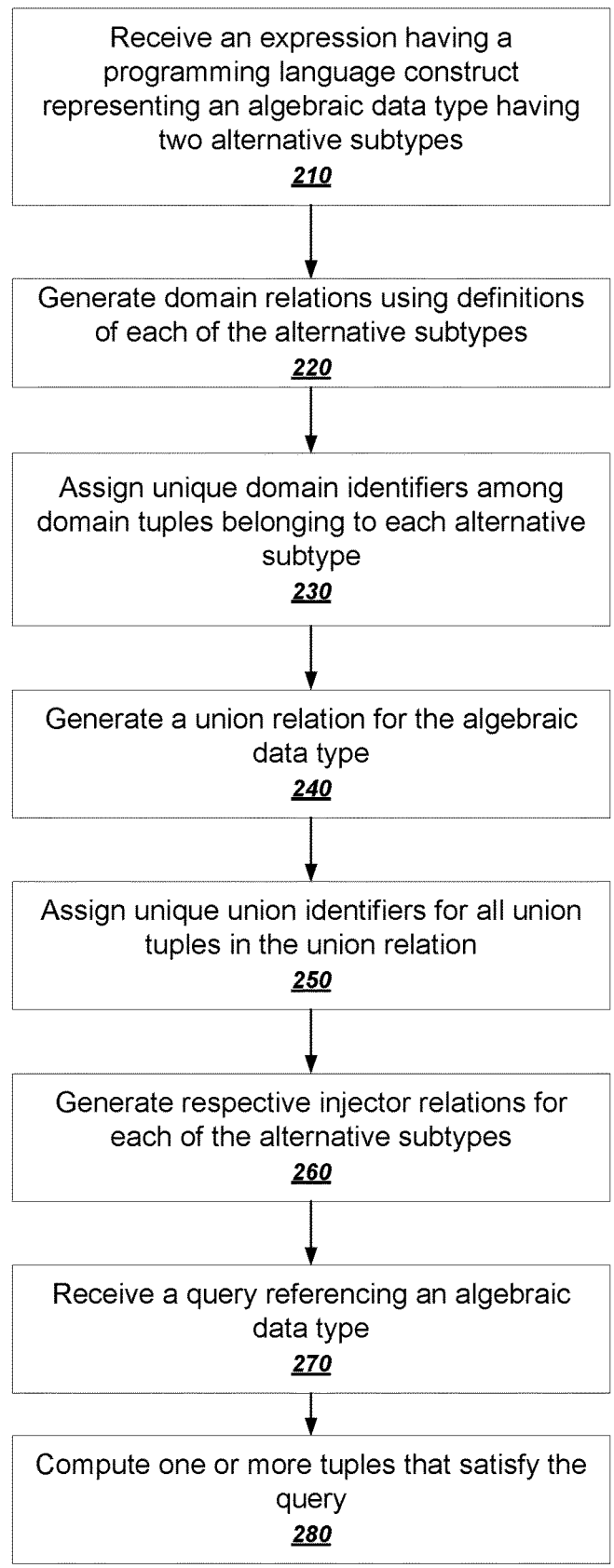
FIG. 2 is a flow chart of an example process for evaluating an expression having an algebraic data type.

FIG. 2 is a flow chart of an example process for evaluating an expression having an algebraic data type. In general, the system generates underlying relations for each alternative subtype in an algebraic data type. These underlying relations allow the algebraic data type to be used in queries that can be handled by the normal semantics of the database query language. The process will be described as being performed by an appropriately programmed system of one or more computers.

The system receives an expression having a programming language construct representing an algebraic data type (210). The expression can be specified as text in a file or using any other appropriate input mechanism, e.g., through a command line terminal.

The programming language construct can specify one or more alternative subtypes for the algebraic data type. The one or more alternative subtypes indicate possible subtypes that a variable having the algebraic data type can assume.

Each alternative subtype specified in the expression defines tuples that belong to a corresponding relation for the alternative subtype. For example, the following pseudocode illustrates an example expression having an algebraic data type:

newtype T=
{
typeA ( ... ) { ... }
or
typeB ( ... ) { ... }
}

The ellipses between the parentheses indicate the arity of a relation for the alternative subtype. For example, "typeA (T x)" would mean that the relation for the subtype has one-tuples having the type T. The ellipses between braces in this expression indicate places for definitions of the alternative subtypes, typeA and typeB. Each of the alternative subtypes can each be newly defined types. And some of the alternative subtypes can be previously defined or built-in types.

For example, the following definition for an alternative subtype includes a statement defining a relation for the alternative subtype. In this example, the statement is a predicate, RelA:

typeA (T x) {RelA(x)}

This definition for the alternative subtype typeA means that typeA includes one-tuples that exist in the relation RelA. For brevity, these one-tuples can be said to "belong" to the alternative subtype typeA.

The relations for the alternative subtypes can have different arity relative to each other. In other words, the alternative subtypes can define tuples having different numbers of elements.

For example, the following definition for an alternative subtype includes a statement defining a relation having two-tuples:

typeB (T x, T y) {exists (x, y|RelB (x) and RelB(y)|x<y)}

The construct "(x, y)" means that the subtype typeB defines a relation having two-tuples. This definition for the alternative subtype typeB means that typeB includes two-tuples in which each element occurs in the relation RelB and where x is less than y.

The "exists( ... )" term is an existentially quantified term. This term asserts that there are elements x and y that both occur in the relation RelB in which x is less than y.

The definitions for the alternative subtypes can also be recursive. For example, the following definition for an alternative subtype includes a recursive predicate:

typeC (T x, T y) {RelC(x, y) or exists (i|RelC(x, i) and typeC(i, y)}

This definition for the alternative subtype typeC means that typeC includes two-tuples that either occur in the relation RelC or that occur in the transitive closure of RelC. Conceptually, this definition can thought of as an ancestor relationship in which RelC defines parent-relationship pairs and typeC defines ancestor-relationship pairs.

The system generates domain relations using definitions of each of the alternative subtypes (220). The system processes each definition of an alternative subtype to generate a corresponding domain relation.

In some implementations, the system parses the definition of the alternative subtypes to generate statements that define the domain relations. For example, the statement can be a predicate in a logic programming language that defines the domain relation. Thus, such a predicate may be referred to as a domain predicate for the alternative subtype. The system can then generate the domain relation by evaluating the domain predicate using a logic programming evaluation engine.

Each domain relation is a relation having tuples belonging to the alternative subtype. In some implementations, the syntax of the expression having the definition of the algebraic data type matches that of an underlying programming language so that the system can use the definition of the alternative subtype directly to compute the domain relation. In other words, the syntax of the alternative subtype definitions may require that the alternative subtype be specified as one or more statements that define a relation, e.g., as a predicate for a particular logic programming language.

For example, the system can transform definition for typeA, given above, into the following domain predicate "dom#typeA":

dom#typeA(T x) {RelA(x)}

The semantics of "(T x)" is the same as described above. In other words, this domain predicate defines a domain relation having one-tuples that occur in the relation RelA.

The prefix "dom#" is a naming convention used to link the domain predicate to, but distinguish it from, the definition of the alternative subtype. This however is merely one example naming convention. The system can use any appropriate naming convention when generating the domain predicate.

The system assigns unique domain identifiers among domain tuples belonging to each alternative subtype (230). In other words, the system assigns a unique domain identifier to all tuples that belong to an alternative subtype. In some implementations, the system generates, from the domain relation for the alternative subtype, a new, domain id relation whose tuples have an extra element for the domain identifier. Conceptually, the domain id relation is equivalent to adding an extra column in a database table for the domain identifier.

The system assigns each unique tuple a unique domain identifier, and the system assigns all equivalent tuples the same domain identifier. In other words, the system can guarantee that if a tuple has been seen before, that it will be assigned the same domain identifier. Special care must be taken when assigning domain identifiers for recursively defined alternative subtypes. This is described in more detail below with reference to FIG. 4.

In some implementations, the system generates additional statements in order to assign domain identifiers to the domain tuples. For example, the system can generate respective domain id predicates for each of one or more domain predicates. Each domain id predicate defines uniquely identified tuples that each assign a unique domain identifier to each of the domain tuples belonging to the alternative subtype. The system can then evaluate the domain id predicate to compute a domain id relation having tuples that assign unique domain identifiers to each of the domain tuples.

For example, the system can generate the following domain id predicate to assign domain identifiers for the domain tuples of typeA:

num#dom#typeA(T x, int id)=idGen(dom#typeA) (x, id)

This expression indicates that the predicate defines a relation of two-tuples having x and id as elements. The "=" syntax means that the relation will have tuples generated by a built-in identifier generator function "idGen." The built-in identifier function idGen takes a predicate argument and returns a relation that adds an identifier element to each of the tuples defined by the relation of the predicate argument.

For example, the relation RelA for the alternative subtype typeA may include the following one-tuples:

(5), (6), (7), (5).

The system can use these one-tuples to generate a domain id relation that assigns domain identifiers to the tuples in the relation RelA. In this example, the system generates each subsequent domain identifier by simply incrementing a previous domain identifier. Thus, the new domain id relation can include the following uniquely identified tuples:

(5, 0), (6, 1), (7, 2).

Because the last tuple (5) had already been processed before, the system did not generate a new domain identifier for this tuple.

To continue the example, if the relation RelB for the alternative subtype typeB included the following two-tuples:

(3, 1), (6, 8), (3, 2), (3, 1), the system can generate a domain id relation that assigns domain identifiers to the tuples in the relation RelB:

(3, 1, 0), (6, 8, 1), (3, 2, 2).

Again, because the last tuple had already been processed and assigned a domain identifier, the system does not generate another domain identifier for this tuple.

These two examples also illustrate that domain identifiers within a subtype are unique, but domain identifiers are not necessarily unique between subtypes. For example, the domain identifier of 1 was used for both (6) from typeA and (6, 8) from typeB.

The system generates a union relation for the algebraic data type (240). The union relation has union tuples that each assign a respective branch identifier to each of the one or more alternative subtypes.

For example, the system can generate a union relation by evaluation the following union predicate for the algebraic data type T:

union#T(int id, int b) {
num#dom#typeA(_, id) and b=0 or
num#dom#typeB(_, _, id) and b=1}

The syntax "(int id, int b)" of this expression means that the union relation union#T has two-tuples with a domain identifier id and a branch identifier b.

The underscore character in this example represents a wild card or "don't care" placeholder that means that that particular element is not used or examined when generating the corresponding union relation.

Thus, "num#dom#typeA(_, id)" defines a set of tuples in the domain id relation for typeA that have domain identifiers. And "num#dom#typeA(_, id) and b=0" defines a relation of two-tuples having each domain identifier from the domain id relation for typeA as well as the branch identifier 0. Similarly, "num#dom#typeB(_, _, id) and b=1" defines two tuples having each domain identifier from the domain id relation for typeB as well as the branch identifier 1. Thus, the definition of union#T defines a union relation having (1) two-tuples having a domain identifier from typeA and a branch identifier of 0, and (2) two-tuples having a domain identifier from typeB and a branch identifier of 1.

In this example, the statements defining the union relation union#T use data from relations having different arity. In other words, the num#dom#typeA relation has an arity of 2, while the num#dom#typeB relation has an arity of 3.

Continuing the example from above, the relation for the predicate union#T can include the following tuples:

(0, 0), (1, 0), (2, 0), (0, 1), (1, 1), (2, 1).

The system assigns unique union identifiers for all union tuples in the union relation (250). The system can use the union relation to define a new, union id relation whose tuples each have an extra element for the union identifier.

In some implementations, the system generates additional statements in order to assign union identifiers to the union tuples. For example, the system can generate the following union id predicate to assign union identifiers to the union tuples of union#T:

num#union#T(int domainid, int b, int unionid)=idGen (union#T) (domainid, b, unionid)

This expression generates a new, union id relation having three-tuples. The elements of the tuple are as follows: "domainid" refers to the domain identifier, "b" refers to the branch identifier, and "unionid" refers to the new union identifier. Because the first two elements are already in the union#T relation, the system can simply use the idGen function to assign union identifiers to the union tuples.

Continuing the example from above, the union id relation for num#union#T can include the following tuples:

(0, 0, 0), (1, 0, 1), (2, 0, 2), (0, 1, 3), (1, 1, 4), (2, 1, 5).

The system generates respective injector relations for each of the alternative subtypes (260). An injector relation for an alternative subtype has injector tuples that each assign a union identifier to each of the original domain tuples. To do so, the system essentially matches domain identifiers in the domain id relation to domain identifiers in the union id relation. For each such match, the system outputs a tuple having all elements of the original domain tuples, plus a last element that is the union identifier. In some implementations, the injector relations are mutually disjoint.

For example, the system can generate the following injector predicate to define an injector relation for typeA:

```
typeA(T x, int unionid) {
  exists (int domainid|
    num#dom#typeA(x, domainid) and
    num#union#T(domainid, 0, unionid))
}
```

This predicate defines a new injector relation having two-tuples. The definition of the injector relation means that two-tuples of this relation are defined by matching the domain id in the domain id relation num#dom#typeA to the domain id in the union id relation num#union#T. The result is a set of two-tuples having a type x and a unionid.

Evaluating this predicate results in a relation having the following tuples:

(5, 0), (6, 1), (7, 2).

Similarly, for typeB the system can generate the following injector predicate to define an injector relation for typeB:

```
typeB(T x, T y, int unionid) {
  exists (int domainid
    num#dom#typeB(x, y, domainid) and
    num#union#T(domainid, 1, unionid))
}
```

This predicate defines a new injector relation having three-tuples. Evaluating this predicate results in the following relation:

(3, 1, 4), (6, 8, 5), (3, 2, 6).

The implementation details of generating the injector relations can remain internal to an evaluation engine for the database query language. However, the system can generate the names of the injector relations to match the names of the alternative subtypes. This is so that queries that use the algebraic data types can refer to the alternative subtypes appropriately. And when a query refers to the subtype, the evaluation engine will actually refer to the injector relation having the same name as the alternative subtype.

After defining the injector relations, the system can respond to queries that refer to the algebraic data type.

The system receives a query referencing an algebraic data type (270). The primary advantage of using algebraic data types is that the system can use a single query that takes an algebraic data type as an argument rather than having multiple different queries for each of the different subtypes. In addition, if the algebraic data type is recursively defined, it may not even be possible to split the query up into multiple queries for each of the different subtypes.

A query that takes an algebraic data type can have multiple alternative statements that each make use of the individual subtypes. As stated above, when a programmer writing a query references a subtype, the evaluation engine will actually use the injector relations that the system generated automatically.

Queries making use of algebraic data types will typically define how the different subtypes relate to each other and how the different subtypes will be used to compute results for the query. This effectively encapsulates how the alternative subtypes relate to each other and makes the code more reusable and robust to change.

The following example query identifies tuples of type T whose first element is equal to 6.

```
int getSame (T x) {
  x=typeA(result) and result=6
  or
  x=typeB(result, _) and result=6
}
```

This example query refers to both of the alternative subtypes, typeA and typeB.

The system computes one or more tuples that satisfy the query (280). When the query refers to the alternative subtype names, the system will actually evaluate the automatically generated injector predicates. The system will then compute tuples that satisfy the query using the tuples in the injection relations.

For the example query defined above, the first statement results in the tuple (6, 1), and (6, 4), the first tuple coming from typeA and the second tuple coming from typeB.

In some implementations, the evaluation engine enforces a type system in which the alternative subtypes are incompatible with each other and possibly with any other types as well, other than the algebraic data type itself. This means that if a program uses one of the alternative subtypes in a place where a different alternative subtype was expected, the system will raise a type error.

For example, using the definition of the algebraic data type T above, the following predicate can be defined:

```
predicate example (T x, typeA y) {
  ...
}
```

This predicate expects a first argument having the algebraic data type T and a second argument having the alternative subtype typeA.

The following invocation of this predicate can cause the system to raise a type error.

example (x, typeB (i))

This is because the second argument in the invocation is of typeB, and the type system defines the alternative subtypes to be incompatible with one another.

Implementing these type checks improves type safety for using alternative subtypes. In particular, if the system allows alternative subtypes to have the same union identifier, the type checking system can prevent one alternative subtype from being used when another is expected.

Figure 3:
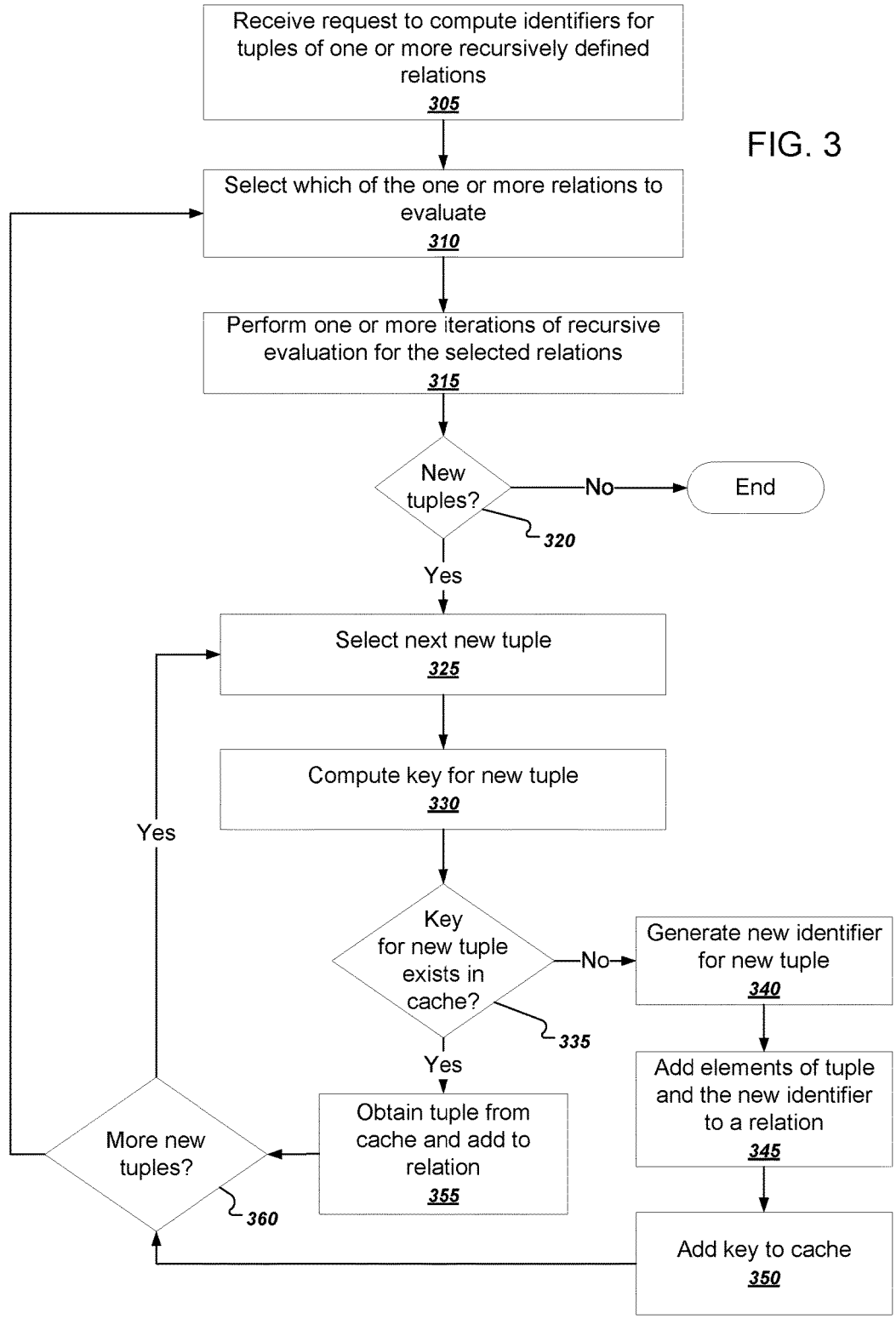
FIG. 3 is a flow chart of an example process for assigning identifiers to the tuples of a recursively defined relation.

FIG. 3 is a flow chart of an example process for assigning identifiers to the tuples of a recursively defined relation. The process can be performed by an evaluation engine for a particular database query language. The process will be described as being performed by an appropriately programmed system of one or more computers.

The system receives a request to compute identifiers for tuples of one or more recursively defined relations (305). For example, the request can be a request to generate identifiers for tuples of a recursively defined subtype of an algebraic data type.

Multiple of the relations can be considered to be recursively defined when one of the relations depends on the other, vice versa, or both. This means that the computation of tuples for one relation can affect the other and vice versa.

For example, in the context of algebraic data types, a subtype can be considered to be recursively defined if it depends on itself or on another alternative subtype of the algebraic data type. For example, the following subtype definition of typeB depends on another alternative subtype of the same algebraic data type, typeA:

newtype S=
{
typeA (T x) {RelA (x)}
or
typeB (T y) {typeA (y)}
}

Thus, when new tuples are added to typeA, new tuples will also be added to typeB.

The system selects which of the one or more recursively defined relations to evaluate (310). As described above, new tuples that are generated for one relation may result in new tuples for another relation. Thus, the system can perform iterations of recursive evaluation for the relations in any appropriate order.

For example, if the definition of a first relation depends on tuples of a second relation, the system select the second relation for full evaluation before evaluating any tuples of the first relation. If the definitions of both relations depend on each other, the system can select both relations and perform the iterations of recursive evaluation concurrently. In some implementations, the system alternates between the recursive relations, performing an iteration on one relation, and then performing another iteration on the other.

The system performs one or more iterations of recursive evaluation for the selected relations (315). The system can use any appropriate evaluation technique for computing tuples of a recursively defined relation, e.g., by using naive evaluation or semi-naive evaluation. In general, the system iteratively applies the recursive definition to the empty relation to generate tuples. The system continues doing so until no new tuples are generated, which means that the system has reached the least fixed point.

The system determines whether or not new tuples have been generated (320). In the case of naive evaluation, this determination is equivalent to determining whether new tuples have been added relative to the last iteration. In the case of semi-naive evaluation, this determination is equivalent to determining whether or not the delta predicate is empty.

If new tuples have been generated, the system selects a next new tuple (branch to 325). The system then computes a key for the selected new tuple (330). The system can compute the key using any appropriate technique that ensures that tuples having equivalent elements have identical keys, and that tuples having at least one differing element have different keys. Thus, in some implementations, the system can compute the key by simply concatenating the elements of the tuple. In some other implementations, the system can hash the element values of the tuple.

The system determines whether the key for the new tuple exists in a cache of keys (335). In other words, the system determines whether the elements of the new tuple are already represented in a cache of keys.

The system can maintain a separate cache of keys for each relation generated for the program being evaluated. In other words, the system can ensure that keys among tuples for one relation are unique, but that keys for tuples belonging to different relations might be the same.

Alternatively, the system can maintain a separate cache for each different arity. In other words, the system can maintain one cache for one-tuples, one cache for two-tuples, and so on up to a maximum arity.

In some implementations, the system maintains a separate cache for each representation type. The representation type is a type that is internal to the evaluation engine and represents the types of elements of a tuple. Thus, a tuple having (int, string) elements would have a different representation type than a tuple having (int, int) elements.

If the key exists in the cache, the system obtains the tuple from the cache and adds the obtained tuple to the new relation (355). The obtained tuple from the cache will have an extra element corresponding to the identifier. The system then determines whether or not more new tuples need to be processed (branch to 360).

If the key does not exist in the cache, the system generates a new identifier for the new tuple (340). The system will generate a unique identifier that distinguishes the tuple from all other tuples so far generated for the relation. For example, the system can use a running count as the identifier, incrementing the count after each key for a tuple is needed.

The system adds the elements of the tuple and the new identifier to a relation (345). In other words, if the tuple originally had n elements, the system generates a new tuple having the n elements from the tuple plus the new identifier for the tuple.

The system adds the key to the cache (350) so that the system can determine whether or not the tuple has been processed before.

The system then determines whether or not more new tuples need to be processed (360). If so, the system selects a next new tuple (branch to 325).

If not, the system again selects which of the one or more predicates to evaluate (branch to 310). If one of the subsequent iterations of evaluation result in no new tuples (320), the process ends (branch to end).

As an alternative to tuple-numbering caches, the system can also implement algebraic data types using tree-based caches. To do so, the system can represent each algebraic data type as a tree structure. The system can then maintain a tree-based cache that assigns a unique identifier to all structurally different tree-structured data types and the same identifier to all structurally identical tree-structured data types.

Figure 4A:
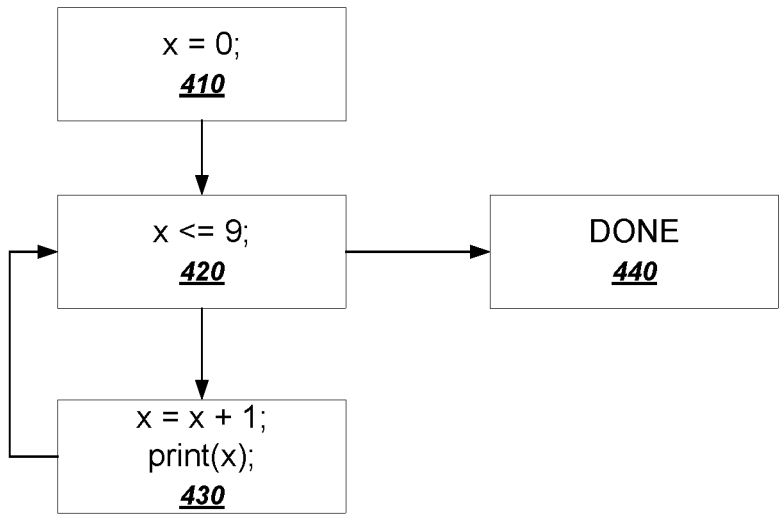
FIGS. 4A and 4B illustrate prior art control flow graphs.
Figure 4B:
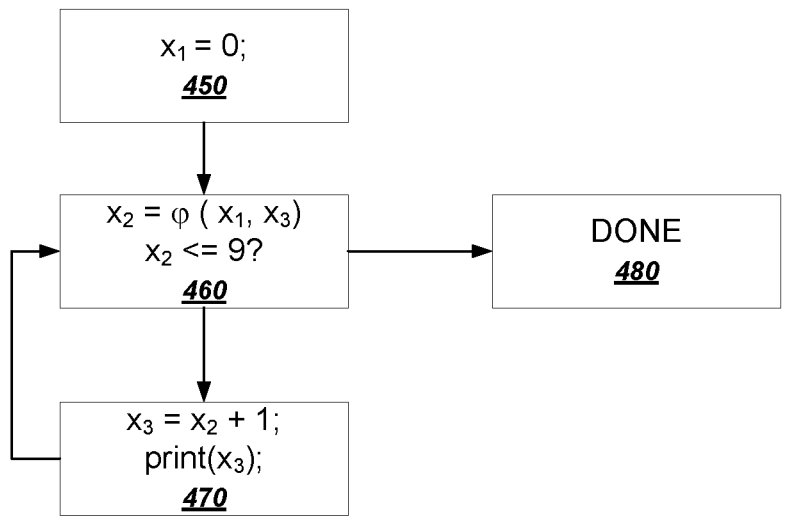

FIGS. 4A and 4B illustrate prior art control flow graphs. These control flow graphs are used as an example to illustrate how algebraic data types can be used in a database query language to perform data flow analysis of source code.

The goal of data flow analysis is to statically approximate the way that data flows between program variables at runtime, but without actually executing the source code. Data flow analysis can be useful for determining properties that hold for every execution of the program.

Consider the following program, written in C-like pseudocode:

x=0;
while (x<=9) {
x=x+1;
print (x);
}

Logic programming can be used to perform data flow analysis of this example program using the control flow graph illustrated in FIGS. 4A and 4B. To do so, a program can define two relations "insns" and "def."

The "insns" relation can have three-tuples "(insn, bb, idx)" that each represent that an instruction insn occurs at the index idx inside the basic block bb.

The "def" relation can have two-tuples "(insn, v)" that each represent that the instruction insn defines or updates the variable v.

FIG. 4A is a control flow graph of this program. The control flow graph includes four basic blocks, 410, 420, 430, and 440. To represent this control flow graph, the following entities are defined for the instructions: i1, i2, i3, and i4; the following entities are defined for the basic blocks: bb1, bb2, bb3, and bb4; and an entity x is defined for the variable x.

The insns relation can now contain the following tuples:
(i1, b1, 1), (i2, b2, 1), (i3, b3, 1), (i4, b3, 2).

These tuples map instructions to basic blocks in which they occur.

The relation def can now contain the following tuples:
(i1, x), (i3, x).

These tuples represent that instructions i1 and i3 define x, but the other instructions do not.

A more sophisticated technique for data flow analysis is known as static single assignment form (SSA) representation of programs. SSA relies on the concept of reaching definitions. A reaching definition is definition that is seen by the use of a particular variable. There is not always a single reaching definition for every variable. In the example program above, for example, the uses of x in the loop have two reaching definitions: x=0 and x=x+1.

SSA handles multiple reaching definitions by introducing pseudo-definitions referred to as phi nodes. The SSA process inserts a phi node at the beginning of each basic block that has two or more reaching definitions.

FIG. 4B illustrates a graph of a program represented in static single assignment form. Basic block 2 (460) has a phi node. All other basic blocks see at most one reaching definition for x.

As shown in the graph, SSA treats each variable as if it were a different variable. Thus, in SSA the variable x in the program above is actually treated as three different variables $x_1$, $x_2$, and $x_3$. These variables may thus be referred to as SSA variables. One advantage of SSA is improved precision. The data flow analysis can now conclude that $x_3$ has a lower bound of one instead of zero.

A database query language program can be written to convert a target program into SSA form. One task in doing so is phi node placement. Phi node placement can be performed using the concept of dominance frontiers: a basic block b needs a phi node for a variable x if there is another basic block b' with a definition of x such that b is in the dominance frontier of b'. The definition of x can be by a normal program definition or by a phi node definition.

Attempting to write a database query language program to handle program definitions and phi node definitions can be cumbersome. A program definition corresponds to an instruction, which is an atomic entity in the relations mentioned above. However, a phi node is actually a pair of database entities, a basic block and a variable. Therefore, the database query language program cannot work on both program definitions and on phi nodes because these entities have different arity.

One workaround would be to write separate programs, one that handles program definitions, and another that handles phi definitions. This is not ideal because the programs are likely to share a lot of code, and efforts at maintaining and updating the programs is duplicated effort. Another workaround would be to introduce an artificial element into the program definitions so that both program definitions and phi definitions had the same arity.

Both of these workarounds fail to encapsulate the concept of an SSA variable into a reusable unit. Instead, they expose the internal representation of an SSA variable in a way that is hard to work with and not robust to change.

By implementing algebraic data types in a database query language, the concept of an SSA variable can be elegantly defined and handled.

For example, an algebraic datatype representing SSA variables can be defined as follows:

```
newtype SSAVariable=
ProgramDef(Instruction i) {
  def(i, _)
}
or
PhiDef(BasicBlock bb, Variable v) {
  exists (BasicBlock bb2|inDominanceFrontier(bb2, bb)|
    exists (Instruction i|insns(i, bb2, _) and def(i, v)) or
    exists (PhiDef(bb2, v))
  )
}
```

This definition of SSA variable has two alternative subtypes: ProgramDef and PhiDef. ProgramDef defines one-tuples of instructions, and PhiDef defines two-tuples having basic blocks and variables.

PhiDef has further definitions, including the predicate inDominanceFrontier that restricts PhiDef to have only tuples for basic blocks that actually need phi nodes for the variable v. PhiDef itself is also recursive with itself, as the definition depends on PhiDef.

From this algebraic data type definition, the system can use the procedures above the generate a number of statements that define system-generated relations for supporting queries that reference the algebraic data type. For example, the system can generate the following domain predicate for ProgramDef.

```
dom#ProgramDef(Instruction i) {
  def(i, _)
}
```

And the system can also generate the following domain predicate for PhiDef:

```
dom#PhiDef(BasicBlock bb, Variable v) {
  exists (BasicBlock bb2|inDominanceFrontier (bb2, bb)|
    exists (Instruction i|insns (i, bb2, _) and def(i, v)) or
    exists (PhiDef(bb2, v))
  )
}
```

As described above, these domain predicates simply use the definitions of the alternative subtypes given within the definition of the algebraic data type.

In order to assign domain identifiers to the domain tuples generated by these domain predicates, the system can generate the following domain id predicates:

num#dom#ProgramDef(Instruction i, int id)=tupleNumbering(dom#ProgramDef) (i, id), and num#dom#PhiDef(BasicBlock bb, Variable v, int id)=tupleNumbering(dom#PhiDef) (bb, v, id).

As described above, these predicates make use of the built-in tupleNumbering function, which can be implemented as described above with reference to FIG. 3.

The system can then generate the following union predicate that assigns a branch identifier to each alternative subtype:

```
union#SSAVariable(int id, int b) {
  num#dom#ProgramDef(_, id) and b=0 or
``` num#dom#PhiDef(_, _, id) and b=1
}

This union predicate assigns b=0 to the ProgramDef subtype and b=1 to the PhiDef subtype.

The system can then generate the following union id predicate to generate identifiers for tuples of the union predicate:

num#union#SSAVariable(int innerid, int b, int outerid)=
   tupleNumbering(union#SSAVariable) (innerid, b, outerid)

The system can then generate the following injector predicates for ProgramDef and PhiDef:

ProgramDef ProgramDef (Instruction i) {
exists (int innerid|
   num#dom#ProgramDef(i, innerid) and
   num#funion#SSAvariable(innerid, 0, result)
)
},
and
PhiDef PhiDef(BasicBlock bb, Variable v) {
exists (int innerid|
   num#dom#PhiDef(bb, v, innerid) and
   num#funion#SSAVariable(innerid, 1, result)
)
}.

Evaluation of these predicates with the example illustrated in FIG. 4B results in the following tuples. Here, instructions for the sample program are represented by source text for readability, although in practice, instructions would not be represented by their actual source text:

| | | |
|---|---|---|
| dom#ProgramDef | = { | ( "x=0"), |
| | | ("x=x+1") } |
| num#dom#ProgramDef | = { | ("x=0", 0), |
| | | ("x=x+1", 1) } |
| dom#PhiDef | = { | (bb2, x) } |
| num#dom#PhiDef | = { | (bb2, x, 0) } |
| union#SSAVariable | = { | (0, 0), |
| | | (1, 0), |
| | | (0, 1) } |
| num#union#SSAVariable | = { | (0, 0, 0), |
| | | (1, 0, 1), |
| | | (0, 1, 2) } |
| ProgramDef | = { | ("x=0", 0), |
| | | ("x=x+1", 1) } |
| PhiDef | = { | (bb2, x, 2) } |

The system can then process queries that make use of the algebraic data type for SSA variables by referencing the injector relations. For example, the following query takes an identifier for an SSA variable and determines to which basic block it belongs. The output is a pair having the identifier and the basic block:

BasicBlock getBB(SSAVariable v) {
exists (Instruction i|v=ProgramDef(i) and insns(i, result, _)) or
v=PhiDef(result, _)
}

Evaluation of this query for the example illustrated in FIG. 4B results in the following tuples:

getBB={(0, bb1), (1, bb3), (2, bb2)}

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:

receiving an expression in a database query language, the expression having a programming language construct representing an algebraic data type, wherein the expression specifies two or more alternative subtypes;

generating respective domain relations using definitions of each of the alternative subtypes within the expression, wherein each domain relation for each alternative subtype has domain tuples belonging to the alternative subtype;

assigning unique domain identifiers among domain tuples belonging to each alternative subtype;

generating a union relation for the algebraic data type, wherein the union relation assigns a respective branch identifier to each of the two or more alternative subtypes and defines union tuples that each have a domain identifier of a domain tuple and a branch identifier of a subtype to which the domain tuple belongs;

assigning unique union identifiers for union tuples belonging to the union relation; and generating respective injector relations for each of the alternative subtypes, wherein each injector relation for each alternative subtype defines, for a particular domain tuple of an alternative subtype, an injector tuple having elements from the particular domain tuple and a union identifier corresponding to the particular domain tuple.

Embodiment 2 is the method of embodiment 1, wherein assigning unique domain identifiers among domain tuples belonging to each alternative subtype comprises generating respective domain id relations for each of the domain relations, wherein each domain id relation for each domain relation of each alternative subtype defines uniquely identified tuples that each assign a unique domain identifier to each of the domain tuples belonging to the alternative subtype.

Embodiment 3 is the method of embodiment 2, wherein a particular domain relation is a recursively defined domain relation, and wherein generating the domain id relation for the recursively defined domain relation comprises:

performing one or more iterations of recursive evaluation for the recursively defined domain relation to obtain a new domain tuple for the recursively defined domain relation;

determining that the elements of the new domain tuple are not represented in a cache of keys;

in response, generating a new domain identifier for the new domain tuple and adding a new domain id tuple to the domain id relation, the domain id tuple having all elements of the new domain tuple and the new domain identifier.

Embodiment 4 is the method of any one of embodiments 1-3, wherein assigning unique union identifiers for union tuples defined by the union relation comprises generating a union id relation for the union relation, wherein the union id relation defines uniquely identified union tuples that each assign a unique number to each of the union tuples.

Embodiment 5 is the method of embodiment 4, wherein evaluating each injector relation for each alternative subject comprises matching domain identifiers in a domain id relation for the alternative subtype to domain identifiers in a union id relation for the algebraic data type.

Embodiment 6 is the method of any one of embodiments 1-5, further comprising:
receiving a query that references a variable having the algebraic data type; and
computing one or more tuples that satisfy the query, wherein each of the one or more tuples that satisfies the query is an injector tuple defined by a respective injector relation of one of the alternative subtypes for the algebraic data type.

Embodiment 7 is the method of any one of embodiments 1-6, wherein computing one or more tuples that satisfy the query comprises computing:
a first injector tuple for a first subtype of the two or more alternative subtypes, and
a second injector tuple for a second subtype of the two or more alternative subtypes.

Embodiment 8 is the method of any one of embodiments 1-7, wherein the injector predicates define respective relations that are mutually disjoint.

Embodiment 9 is the method of any one of embodiments 1-8, wherein at least one particular alternatives subtype is a recursive subtype.

Embodiment 10 is the method of any one of embodiments 1-9, wherein at least one particular alternative subtype depends on another one of the alternative subtypes.

Embodiment 11 is the method of any one of embodiments 1-10, wherein generating a domain relation for an alternative subtype comprises evaluating the definition of the alternative subtype as a predicate in an underlying programming language.

Embodiment 12 is a method comprising:
receiving a request to compute identifiers for tuples of one or more recursively defined relations; and
performing the following operations until no new tuples are generated for any of the one or more recursively defined relations:
  selecting one or more of the recursively defined relations to evaluate,
  performing one or more iterations of recursive evaluation for each of the selected one or more relations,
  computing respective keys for each tuple of any new tuples, wherein each key for each tuple is computed using each element of one or more elements of the tuple,
  determining, for each key computed for each new tuple, whether the key occurs in a respective cache of keys for a relation of the tuple,
    for each key that occurs in the cache of keys, obtaining a tuple for the key from the cache and adding the obtained tuple to a new relation;
    for each key that does not occur in the cache of keys, generating a new identifier for the key, adding, to a new relation for each key of each tuple of any keys that do not occur in the cache of keys for a relation, a new tuple comprising (1) elements of the tuple and (2) the new identifier for the key, and adding each key for each new tuple that does not occur in the cache of keys for the relation of the tuple to the cache of keys for the relation.

Embodiment 13 is the method of embodiment 12, wherein a first recursively defined relation depends on a second recursively defined relation.

Embodiment 14 is the method of any one of embodiments 12-13, wherein selecting one or more of the recursively defined relations to evaluate comprises selecting multiple recursively defined relations to evaluate.

Embodiment 15 is the method of any one of embodiments 12-14, wherein evaluation of a first recursively defined relation results in additional tuples for a second recursively defined relation.

Embodiment 16 is the method of any one of embodiments 12-15, wherein computing respective keys for each tuple of any new tuples comprises computing a same key for all tuples that have equivalent elements.

Embodiment 17 is the method of any one of embodiments 12-16, wherein computing respective keys for each tuple of any new tuples comprises computing different keys for any pairs of tuples that have at least one different element.

Embodiment 18 is the method of any one of embodiments 12-17, wherein a first recursively defined relation has tuples with N elements, and wherein the new relation for the first recursively defined relation has tuples with N+1 elements.

Embodiment 19 is the method of any one of embodiments 12-18, wherein the one or more recursively defined relations define alternative subtypes of an algebraic data type for a database query language.

Embodiment 20 is the method of any one of embodiments 12-19, further comprising:
maintaining a different respective cache for all tuples having a same arity.

Embodiment 21 is the method of any one of embodiments 12-20, further comprising:
maintaining a different respective cache for each of one or more representation types of tuples, wherein each representation type for a tuple represents individual types of elements of the tuple.

Embodiment 22 is the method of any one of embodiments 12-21, wherein receiving the request to compute identifiers for tuples of one or more recursively defined relations comprises receiving an expression in a database query language having an algebraic data type with one or more recursively defined alternative subtypes.

Embodiment 23 is a system comprising: one or more computers and one or more storage devices storing instructions that are operable, when executed by the one or more computers, to cause the one or more computers to perform the method of any one of embodiments 1 to 22.

Embodiment 24 is a computer storage medium encoded with a computer program, the program comprising instructions that are operable, when executed by data processing apparatus, to cause the data processing apparatus to perform the method of any one of embodiments 1 to 22.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving an expression in a database query language, the expression having a programming language construct representing an algebraic data type, wherein the expression specifies two or more alternative subtypes, and wherein a particular alternative subtype of the two or more alternative subtypes is a recursively defined subtype;
   generating respective domain relations using definitions of each of the alternative subtypes within the expression, wherein each domain relation for each alternative subtype has domain tuples belonging to the alternative subtype, including generating a recursively defined domain relation for the recursively defined alternative subtype and performing one or more iterations of recursive evaluation for the recursively defined domain relation to generate one or more new domain tuples belonging to the recursively defined domain relation;
   generating respective domain id relations for each of the domain relations, wherein each domain id relation for each domain relation of each alternative subtype defines uniquely identified tuples that each assign a unique domain identifier to each of the domain tuples belonging to the respective domain relation of each alternative subtype, including performing, for each domain tuple of one or more new domain tuples generated for the recursively defined domain relation, operations comprising:
      determining that the elements of the new domain tuple are not represented in a cache of keys; and
      in response, generating a new domain identifier for the new domain tuple and adding a new domain id tuple to the domain id relation, the new domain id tuple having all elements of the new domain tuple and the new domain identifier;
   generating a union relation for the algebraic data type, wherein the union relation assigns a respective branch identifier to each of the two or more alternative subtypes and defines union tuples that each have a domain identifier of a domain tuple and a branch identifier of a subtype to which the domain tuple belongs;
   assigning unique union identifiers for union tuples belonging to the union relation; and
   generating respective injector relations for each of the alternative subtypes, wherein each injector relation for each alternative subtype defines, for a particular domain tuple of an alternative subtype, an injector tuple having elements from the particular domain tuple and a union identifier corresponding to the particular domain tuple.

2. The method of claim 1, wherein assigning unique union identifiers for union tuples defined by the union relation comprises generating a union id relation for the union relation, wherein the union id relation defines uniquely identified union tuples that each assign a unique number to each of the union tuples.

3. The method of claim 2, wherein generating respective injector relations for each of the alternative subtypes comprises matching domain identifiers in a domain id relation for the alternative subtype to domain identifiers in a union id relation for the algebraic data type.

4. The method of claim 1, further comprising:
   receiving a query that references a variable having the algebraic data type; and
   computing one or more tuples that satisfy the query, wherein each of the one or more tuples that satisfies the query is an injector tuple defined by a respective injector relation of one of the alternative subtypes for the algebraic data type.

5. The method of claim 4, wherein computing one or more tuples that satisfy the query comprises computing:
   a first injector tuple for a first subtype of the two or more alternative subtypes, and
   a second injector tuple for a second subtype of the two or more alternative subtypes.

6. The method of claim 1, wherein the injector relations are mutually disjoint.

7. The method of claim 1, wherein at least one particular alternative subtype depends on another one of the alternative subtypes.

8. The method of claim 1, wherein generating respective domain relations using definitions of each of the alternative subtypes comprises evaluating the definition of the alternative subtype as a predicate in an underlying programming language.

9. A system comprising one or more computers and one or more storage devices storing instructions that are operable, when executed by the one or more computers, to cause the one or more computers to perform operations comprising:
   receiving an expression in a database query language, the expression having a programming language construct representing an algebraic data type, wherein the expression specifies two or more alternative subtypes, and wherein a particular alternative subtype of the two or more alternative subtypes is a recursively defined subtype;
   generating respective domain relations using definitions of each of the alternative subtypes within the expression, wherein each domain relation for each alternative subtype has domain tuples belonging to the alternative subtype, including generating a recursively defined domain relation for the recursively defined alternative subtype and performing one or more iterations of recursive evaluation for the recursively defined domain relation to generate one or more new domain tuples belonging to the recursively defined domain relation;

generating respective domain id relations for each of the domain relations, wherein each domain id relation for each domain relation of each alternative subtype defines uniquely identified tuples that each assign a unique domain identifier to each of the domain tuples belonging to the respective domain relation of each alternative subtype, including performing, for each domain tuple of one or more new domain tuples generated for the recursively defined domain relation, operations comprising:

determining that the elements of the new domain tuple are not represented in a cache of keys; and in response, generating a new domain identifier for the new domain tuple and adding a new domain id tuple to the domain id relation, the new domain id tuple having all elements of the new domain tuple and the new domain identifier;

generating a union relation for the algebraic data type, wherein the union relation assigns a respective branch identifier to each of the two or more alternative subtypes and defines union tuples that each have a domain identifier of a domain tuple and a branch identifier of a subtype to which the domain tuple belongs;

assigning unique union identifiers for union tuples belonging to the union relation; and generating respective injector relations for each of the alternative subtypes, wherein each injector relation for each alternative subtype defines, for a particular domain tuple of an alternative subtype, an injector tuple having elements from the particular domain tuple and a union identifier corresponding to the particular domain tuple.

10. The system of claim 9, wherein assigning unique union identifiers for union tuples defined by the union relation comprises generating a union id relation for the union relation, wherein the union id relation defines uniquely identified union tuples that each assign a unique number to each of the union tuples.

11. The system of claim 10, wherein generating respective injector relations for each of the alternative subtypes comprises matching domain identifiers in a domain id relation for the alternative subtype to domain identifiers in a union id relation for the algebraic data type.

12. The system of claim 9, wherein the operations further comprise:

receiving a query that references a variable having the algebraic data type; and computing one or more tuples that satisfy the query, wherein each of the one or more tuples that satisfies the query is an injector tuple defined by a respective injector relation of one of the alternative subtypes for the algebraic data type.

13. The system of claim 12, wherein computing one or more tuples that satisfy the query comprises computing:

a first injector tuple for a first subtype of the two or more alternative subtypes, and a second injector tuple for a second subtype of the two or more alternative subtypes.

14. The system of claim 9, wherein the injector relations are mutually disjoint.

15. The system of claim 9, wherein at least one particular alternative subtype depends on another one of the alternative subtypes.

16. The system of claim 9, wherein generating respective domain relations using definitions of each of the alternative subtypes comprises evaluating the definition of the alternative subtype as a predicate in an underlying programming language.

17. A computer program product, encoded on one or more non-transitory computer storage media, comprising instructions that when executed by one or more computers cause the one or more computers to perform operations comprising:

receiving an expression in a database query language, the expression having a programming language construct representing an algebraic data type, wherein the expression specifies two or more alternative subtypes, and wherein a particular alternative subtype of the two or more alternative subtypes is a recursively defined subtype;

generating respective domain relations using definitions of each of the alternative subtypes within the expression, wherein each domain relation for each alternative subtype has domain tuples belonging to the alternative subtype, including generating a recursively defined domain relation for the recursively defined alternative subtype and performing one or more iterations of recursive evaluation for the recursively defined domain relation to generate one or more new domain tuples belonging to the recursively defined domain relation;

generating respective domain id relations for each of the domain relations, wherein each domain id relation for each domain relation of each alternative subtype defines uniquely identified tuples that each assign a unique domain identifier to each of the domain tuples belonging to each alternative subtype, including performing, for each domain tuple of one or more new domain tuples generated for the recursively defined domain relation, operations comprising:

determining that the elements of the new domain tuple are not represented in a cache of keys; and in response, generating a new domain identifier for the new domain tuple and adding a new domain id tuple to the domain id relation, the new domain id tuple having all elements of the new domain tuple and the new domain identifier;

generating a union relation for the algebraic data type, wherein the union relation assigns a respective branch identifier to each of the two or more alternative subtypes and defines union tuples that each have a domain identifier of a domain tuple and a branch identifier of a subtype to which the domain tuple belongs;

assigning unique union identifiers for union tuples belonging to the union relation; and generating respective injector relations for each of the alternative subtypes, wherein each injector relation for each alternative subtype defines, for a particular domain tuple of an alternative subtype, an injector tuple having elements from the particular domain tuple and a union identifier corresponding to the particular domain tuple.

18. The computer program product of claim 17, wherein assigning unique union identifiers for union tuples defined by the union relation comprises generating a union id relation for the union relation, wherein the union id relation defines uniquely identified union tuples that each assign a unique number to each of the union tuples.

19. The computer program product of claim 18, wherein generating respective injector relations for each of the alternative subtypes comprises matching domain identifiers in a domain id relation for the alternative subtype to domain identifiers in a union id relation for the algebraic data type.

20. The computer program product of claim 17, wherein the operations further comprise:
   receiving a query that references a variable having the algebraic data type; and
   computing one or more tuples that satisfy the query, wherein each of the one or more tuples that satisfies the query is an injector tuple defined by a respective injector relation of one of the alternative subtypes for the algebraic data type.

21. The computer program product of claim 20, wherein computing one or more tuples that satisfy the query comprises computing:
   a first injector tuple for a first subtype of the two or more alternative subtypes, and
   a second injector tuple for a second subtype of the two or more alternative subtypes.

22. The computer program product of claim 17, wherein the injector relations are mutually disjoint.

23. The computer program product of claim 17, wherein at least one particular alternative subtype depends on another one of the alternative subtypes.

24. The computer program product of claim 17, wherein generating respective domain relations using definitions of each of the alternative subtypes comprises evaluating the definition of the alternative subtype as a predicate in an underlying programming language.

* * * * *